(12) United States Patent
Nault (10) Patent No.: US 6,698,478 B2
(45) Date of Patent: Mar. 2, 2004

(54) MOBILE SILVICULTURAL APPARATUS AND METHOD FOR OPERATING THE SAME

(75) Inventor: Louis-Phillippe Nault, Dolbeau-Mistassini (CA)

(73) Assignee: Les Equipments Nokamic, Inc., Dolbeau-Mistassini (CA)

( * ) Notice: Subject to any disclaimer, the term of this patent is extended or adjusted under 35 U.S.C. 154(b) by 67 days.

(21) Appl. No.: 10/099,617

(22) Filed: Mar. 14, 2002

(65) Prior Publication Data

US 2002/0157730 A1 Oct. 31, 2002

Related U.S. Application Data

(63) Continuation-in-part of application No. 09/952,692, filed on Sep. 13, 2001, now Pat. No. 6,550,505.

(30) Foreign Application Priority Data

Sep. 15, 2000 (CA) ............................................... 2319838
Nov. 22, 2001 (CA) ............................................... 2363207

(51) Int. Cl.[7] ......................... A01G 23/00; A01G 23/08
(52) U.S. Cl. ........................... 144/336; 37/302; 56/234; 56/DIG. 9; 56/13.6; 144/4.1; 144/34.1; 180/9.1; 180/89.12; 280/6.15; 280/677
(58) Field of Search ................................. 144/4.1, 34.1, 144/24.22, 24.13, 335, 336, 343; 83/928; 180/89.12, 9.1; 280/677, 678, 781, 6.15; 241/101.71, 101.72, 101.73, 101.74; 56/13.4, 13.6, 13.7, 234, DIG. 9; 37/302

(56) References Cited

U.S. PATENT DOCUMENTS

| | | | | | |
|---|---|---|---|---|---|
| 3,797,541 | A | * | 3/1974 | Kurelek et al. | 144/4.1 |
| 4,350,190 | A | * | 9/1982 | McColl | 144/4.1 |
| 4,355,670 | A | * | 10/1982 | Ohrberg et al. | 144/34.1 |
| 5,794,866 | A | * | 8/1998 | Shinn | 241/101.72 |
| 5,848,627 | A | * | 12/1998 | Brown | 144/34.1 |
| 6,454,294 | B1 | * | 9/2002 | Bittner et al. | 280/677 |
| 6,460,643 | B1 | * | 10/2002 | Degelman | 180/89.12 |
| 6,554,558 | B2 | * | 4/2003 | Knight | 414/685 |

* cited by examiner

Primary Examiner—W. Donald Bray
(74) Attorney, Agent, or Firm—Donald R. Boys; Central Coast Patent Agency, Inc.

(57) ABSTRACT

A mobile silvicultural apparatus for use in a land of trees comprising mature trees and immature trees. The apparatus includes a steerable wheeled support frame, an articulated boom, a motor system, and a control system. The steerable wheeled support frame has a horizontally extending ground-clearing section, and first and second opposite vertical side sections. The ground-clearing and side sections define a tunnel-shaped passage through which the immature trees are allowed to pass as the support frame travels thereover. The articulated boom is mounted to the support frame for selectively manipulating the mature trees. The motor system is used for imparting motion to the support frame and the control system is used for controlling the steerable support frame, the motor system, and the articulated boom.

19 Claims, 12 Drawing Sheets

MOBILE SILVICULTURAL APPARATUS AND METHOD FOR OPERATING THE SAME

This application is a C-I-P of Ser. No. 09/952,692 filed Sep. 13, 2001, and now U.S. Pat. No. 6,550,505.

FIELD OF THE INVENTION

The present invention relates to a silvicultural apparatus. More particularly, the present invention relates to a mobile silvicultural apparatus for use in a land of trees in order to carry out various silvicultural applications and also relates to the method for operating the same.

BACKGROUND OF THE INVENTION

Known in the art is a silvicultural process which is referred to as "pre-commercial thinning" and which essentially consists in selectively thinning a land comprising mature trees and immature trees in order to keep only certain types of trees, mainly the immature trees, in order to carry out a commercially viable harvesting while allowing a proper regeneration of the land.

It is also known in the art that it is often difficult, dangerous, and expensive to perform pre-commercial thinning with motor-manual teams, especially when, for example, natural regeneration is dense and/or working grounds are not leveled. In such adverse circumstances, the risk of work accidents is high and manual operations are uneconomical. It would be therefore very useful to provide an apparatus and method for operating the same in order to carry out pre-commercial thinning in such adverse circumstances which would be safer, more efficient, and more cost-effective than what is possible with motor-manual teams.

Also known in the art are two main silvicultural processes for harvesting trees, namely the tree length harvesting process and the cut-to-length harvesting process.

The tree length harvesting process essentially consists in cutting trees with a mechanical tree feller, piling them on the cutting grounds, after which they are skid onto the side of the trails where they are then branched out.

The cut-to-length harvesting process essentially consists in cutting the tree stems with a multi-functional tree feller, branching out said stems and then cutting them to length on the cutting grounds. Afterwards, a transporter carries out the picking of the cut logs along the side of the trails.

These two main harvesting processes are designed so that equipment must often pass over the same tracks of a trail. In fact, by doing so, one tries to minimize the damages caused to the regeneration and to the soil by concentrating the passages at the same locations. Hence, with these harvesting processes, the surface protected is a function of the distance between the passages. Thus, it is often difficult to protect more than 75% of the land considering that the articulated booms which carry the harvester heads have a physical length limit and considering also that after several repeated passages along the same strips of land, both the soil and the regeneration along these strips are often destroyed by the machinery traveling thereover. This phenomenon is known as rutting. Furthermore, this resulting effect goes against one of the main principles in silviculture which consists in maintaining a good regeneration distribution coefficient. In fact, if one destroys 25% of the surface land after a harvest, the corresponding regeneration distribution coefficient is thus necessarily less than 75%, whereas it is often greater than 75% before the harvest even took place.

Therefore, in view of the above, it would be very useful to provide an apparatus and method for operating the same which when used for the above-mentioned harvesting processes, would enable to obtain a better regeneration distribution coefficient when compared to what is possible with some of the prior art.

Another silvicultural process known in the art is often referred to "pre-commercial clearing" which essentially consists in selectively clearing a land having brush and young trees in order to keep only certain types of trees, and removing the rest of the undesired brush and trees.

Selective clearing is a silvicultural process, which is generally done manually by workers equipped with portative brush clearing machines. The work involves selecting the stems of trees that are to be kept according to predetermined quantity and quality standards, and then cutting the rest of the brush with the portative brush clearing machine as workers walk on the field. It has been found that such a manual clearing technique requires an enormous amount of time and a large number of workers, especially if the surface to be cleared is large, thereby rendering this type of harvesting process cumbersome, time-consuming, and cost ineffective. Therefore, there is a need for an apparatus and method for operating the same which would enable to carry out improved selective clearing.

U.S. Pat. No. 4,355,670 granted on Oct. 26, 1982, to OHRBERG et al. discloses a vehicle having a clearing head located at the front of the vehicle for fragmenting woody material. The hydraulically adjustable clearing head includes a horizontally disposed cylindrical drum.

U.S. Pat. No. 4,236,554 granted on Dec. 2, 1980, to NICHOLSON, discloses a tractor having a front feller and chipper. The feller includes an elongated bladed rotary felling cutter head having its length extending transversely of the tractor between lower front portions. The chipper includes a chipping cutter head spaced upwards and rearward from the feller.

Also known to the Applicant are the following U.S. patents describing different harvesting devices: U.S. Pat. Nos. 3,754,603; 4,232,719; 4,390,134; 4,537,362; and 5,526,637.

None of the above-mentioned patents seem to disclose or even suggest a mobile silvicultural apparatus and method for operating the same which would overcome several of the above-mentioned problems associated with the prior art.

SUMMARY OF THE INVENTION

An object of the present invention is to provide a silvicultural apparatus and method associated thereto which would satisfy some of the above-mentioned needs, and would thus be an improvement over the harvesting devices and methods known in the art.

In accordance with the present invention, the above object is achieved by a mobile silvicultural apparatus for use in a land of trees, the apparatus comprising:

a steerable wheeled support frame comprising a horizontally extending ground-clearing section, and first and second opposite vertical side sections, the ground-clearing and side sections defining a tunnel-shaped passage through which trees of a certain type are allowed to pass as the support frame travels thereover;

manipulating means mounted to the support frame for selectively manipulating trees of the land;

motor means for imparting motion to the support frame; and control means for controlling the steerable support frame, the motor means, and the manipulating means.

According to a first preferred embodiment of the present invention, there is provided a land clearing tractor for selectively clearing a land of brush and trees, the tractor comprising:

a traction unit for moving the tractor along a direction of travel;

a supporting frame connected to the traction unit, the frame having first and second sides, and a raised section between the first and second sides;

a first shredder head operatively connected to the first side of the frame and oriented parallel to the direction of travel, the first shredder head being movable between elevated and lowered positions for clearing brush and trees in a first band; and a second shredder head operatively connected to the second side of the frame, the second shredder head being parallel to the first shredder head and spaced apart therefrom, the second shredder head being movable between elevated and lowered positions for clearing brush and trees in a second band spaced apart from the first band and thereby leaving between the first and second bands a residual band of brush and trees.

As can be appreciated, the land clearing tractor according to the first preferred embodiment of the present invention cuts brush and trees in a pair of spaced apart bands so that brush and trees between the cut bands can be later selectively cut.

According to another aspect of the first preferred embodiment of the present invention, there is also provided a land clearing tractor for selectively clearing a land of brush and trees, the tractor comprising:

a traction unit for moving the tractor along a direction of travel;

a frame having an inverted U-shaped cross-section with first and second sides, and a raised section between the first and second sides positioned between 0.5 and 1.5 meters from ground;

a first shredder head operatively connected to the first side of the frame through a first actuating lever arm, the first shredder head being oriented parallel to the direction of travel and being movable between elevated and lowered positions for clearing brush and trees in a first band; and a second shredder head operatively connected to the second side of the frame through a second actuating lever arm, the second shredder head being parallel to the first shredder head and spaced apart therefrom, the second shredder head being movable between elevated and lowered positions for clearing brush and trees in a second band spaced apart from the first band and thereby leaving between the first and second bands a residual band of brush and trees.

According to yet another aspect of the first preferred embodiment of the present invention, there is also provided a process for selectively clearing brush and trees of a land, comprising the steps of:

clearing simultaneously first and second parallel and spaced apart bands of brush and trees with a land clearing tractor; and manually and selectively cutting brush and trees in a residual band between the two parallel and spaced apart bands.

According to a second preferred embodiment of the present invention, there is provided a mobile silvicultural apparatus for use in a land of trees comprising mature trees and immature trees, the apparatus comprising:

a steerable wheeled support frame comprising a horizontally extending ground-clearing section, and first and second opposite vertical side sections, the ground-clearing and side sections defining a tunnel-shaped passage through which the immature trees are allowed to pass as the support frame travels thereover;

an articulated boom mounted to the support frame for selectively manipulating the mature trees;

motor means for imparting motion to the support frame; and control means for controlling the steerable support frame, the motor means, and the articulated boom.

Preferably, the tunnel-shaped passage has a smooth configuration in order to minimize damages to the immature trees passing through the tunnel-shaped passage as the ground clearing section of the support frame travels over said immature trees.

Preferably also, the articulated boom comprises a harvester head selected from the group consisting of a multi-functional tree feller and a grapple for grappling a tree.

Preferably also, the steerable wheel support frame comprises front and rear units and a universal joint coupling the front unit to the rear unit.

Preferably also, front and rear wheeled assemblies are mounted respectively to the front and rear units of the support frame. These front and rear wheeled assemblies preferably comprise hydrostatic motor-wheels.

According to another aspect of the second preferred embodiment of the present invention, there is also provided a silvicultural method for harvesting mature trees in the land of trees comprising mature trees and immature trees, the method comprising the steps of:

a) providing the above-mentioned apparatus;

b) driving the apparatus of step a) along a first strip of the land;

c) stopping the apparatus at different locations along said strip of land; and d) felling and harvesting mature trees located around said different locations.

Preferably, the silvicultural method comprises the additional steps of:

e) providing a mobile silvicultural apparatus according to a transporting embodiment of the invention;

f) driving the apparatus of step e) along said strip of land; and g) picking up at each of said different locations the harvested mature trees and transporting the same outside the land.

Preferably also, the silvicultural method comprises the step of:

h) sequentially repeating steps a) to g) along additional strips of land substantially parallel to said first strip of land until a desired portion of the land is harvested.

Preferably also, the silvicultural method comprises, prior to performing a first sequence of steps a) to g), a step of determining a distance between each said strips of land, said distance being determined such that a minimum amount of said strips is required to harvest the desired portion of the land.

The invention and its advantages will be better understood upon reading the following non-restrictive description of first and second preferred embodiments thereof, made with reference to the accompanying drawings.

DETAILED DESCRIPTION OF FIRST AND SECOND PREFERRED EMBODIMENTS OF THE INVENTION

In the following description, similar features in the drawings have been given similar reference numerals and in order to weight down the figures, some elements are not referred to in some figures if they were already identified in a precedent figure. The embodiments shown in the figures are preferred.

Moreover, although the present invention was primarily designed for various silvicultural purposes, it could be used in different fields for other purposes, such as for agricultural applications, as apparent to a person skilled in the art. For this reason, expressions such as "silvicultural" and/or "trees" and any other references and/or other expressions equivalent thereto should not be taken as to limit the scope of the present invention and include all other objects and all other purposes with which the present invention could be used and may be useful.

In addition, although the preferred embodiments of the mobile silvicultural apparatus as shown comprise various components such as shredder heads, an articulated boom, hydrostatic motor-wheels, a diesel engine, hydraulic pumps, a cabin, receiving means, etc., not all of these components are essential to the invention and thus should not be taken in their restrictive sense, i.e. should not be taken as to limit the scope of the present invention. It is to be understood, as also apparent to a person skilled in the art, that other suitable components and cooperations thereinbetween may be used for the mobile silvicultural apparatus according to the present invention, as will be explained hereinafter, without departing from the scope of the invention.

Moreover, expressions such as "brush", "trees" and "stems", as well as any equivalent expressions and/or compound words thereof, may be used interchangeably in the context of the present description. The same applies for any other mutually equivalent expressions, such as "land" and "ground" for example, as well as "cleared", "harvested" and "manipulated", as also apparent to a person skilled in the art.

Furthermore, it is to be understood that the expression "to pass" from expressions such as "through which the immature trees are allowed to pass as the support frame travels thereover", as used in the context of the present description (particularly with reference to the second preferred embodiment of the present invention), obviously does not imply that the trees used with the present invention are mobile, per se. As it is very well known, normal trees which are rooted to the ground are not mobile per se, but may seem to be mobile from a relative point of view if a mobile structure such as the support frame of the silvicultural apparatus, and more specifically its ground clearing section, passes over fixed and stationary objects, such as the above-mentioned trees for example. Indeed, it is very well known in the art that there may be a relative motion between the two which can be considered as the trees "passing by" the support frame, knowing very well that these same trees are not mobile and securely rooted to the ground. Hence, in the context of the present description, the expression "to pass" and any other references and/or other expressions equivalent thereto should not be taken in its restrictive sense, i.e. from an inertial point of view, but rather in a broader sense, i.e. from a relative point of view, as apparent to a person skilled in the art and also as a result of common sense.

Furthermore, it is to be understood that the expression "mature trees" as used in the context of the present description refers to harvestable trees of commercial value whereas "immature trees" refer to trees which are young and too small yet to have an immediate commercial value but which nevertheless represent future tree population.

Broadly described, the mobile silvicultural apparatus according to the preferred embodiments of the invention as illustrated in the accompanying drawings is a mobile silvicultural apparatus for use in a land of trees. The apparatus comprises a steerable wheeled support frame, manipulating means, motor means and control means. The steerable wheeled support frame comprises a horizontally extending ground-clearing section, and first and second opposite vertical side sections. The ground-clearing and side sections define a tunnel-shaped passage through which trees of a certain type are allowed to pass as the support frame travels thereover. The manipulating means are mounted to the support frame for selectively manipulating trees of the land. The motor means are used for imparting motion to the support frame. The control means are used for controlling the steerable support frame, the motor means, and the manipulating means.

First Preferred Embodiment of the Invention—Land Clearing Tractor and Method Associated Thereto Referring to FIGS. 1 to 4, there is shown the mobile silvicultural apparatus used as a land clearing tractor 1 according to the first preferred embodiment of the present invention. The land clearing tractor 1 may be a conventional type of tractor with a cabin unit 2 wherein the operator can control the operation of the tractor 1. As with conventional tractors, the present tractor 1 is provided with a traction unit 3 for moving it along a direction of travel.

Figure 1:
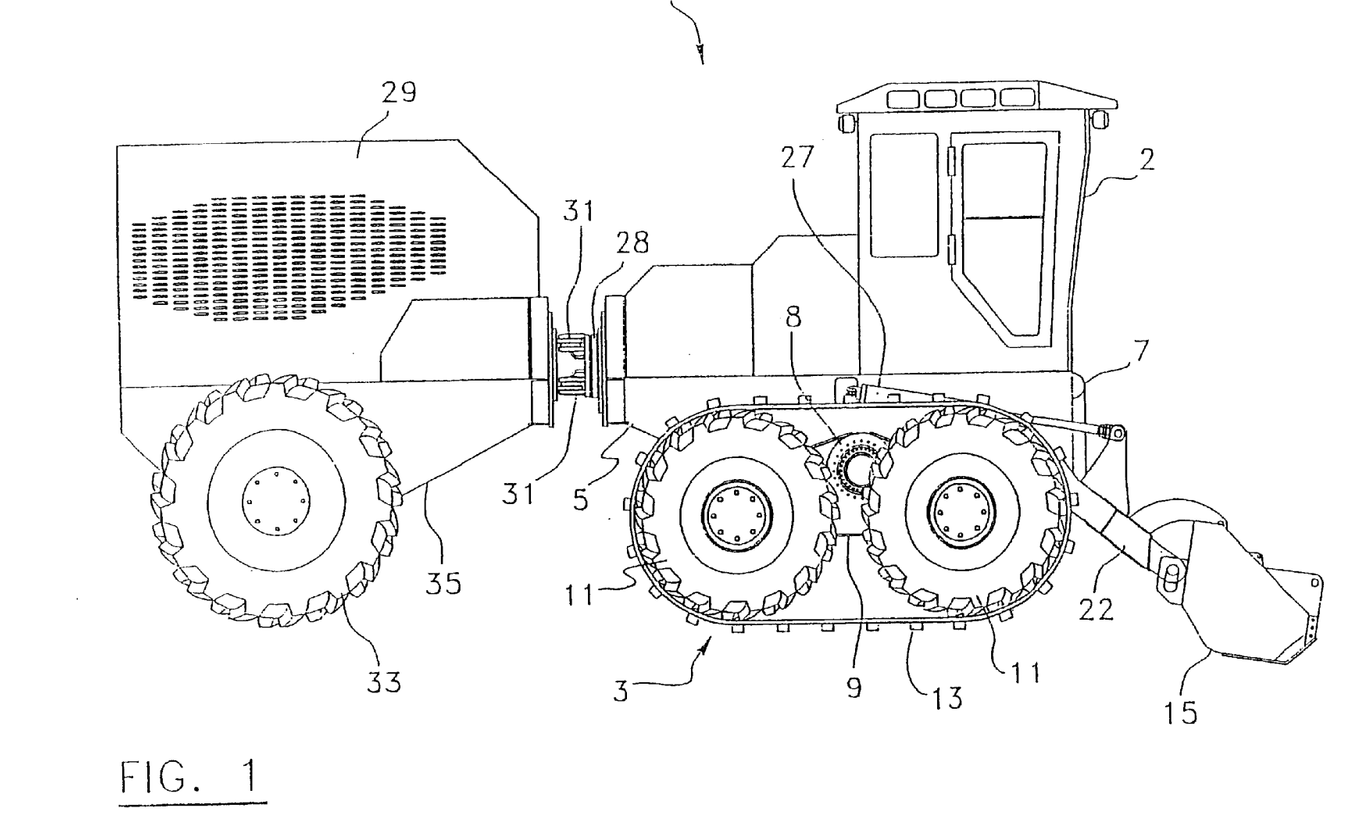
FIG. 1 is a side view of the mobile silvicultural apparatus used as a land clearing tractor according to the first preferred embodiment of the present invention with a rear cart and a shredder head in a lowered position.
Figure 2:
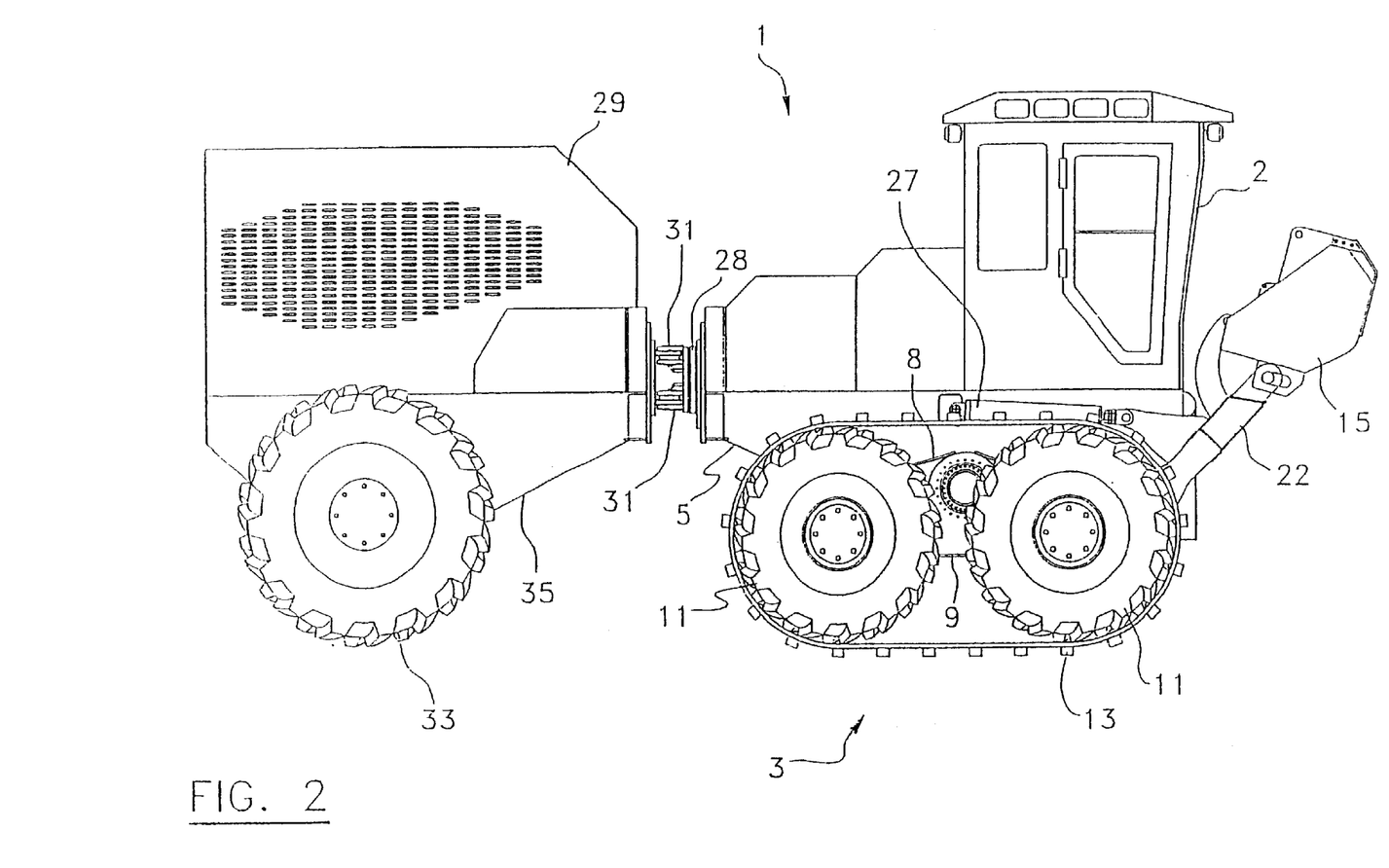
FIG. 2 is side view of the land clearing tractor shown in FIG. 1 with its shredder head in an elevated position.
Figure 3:
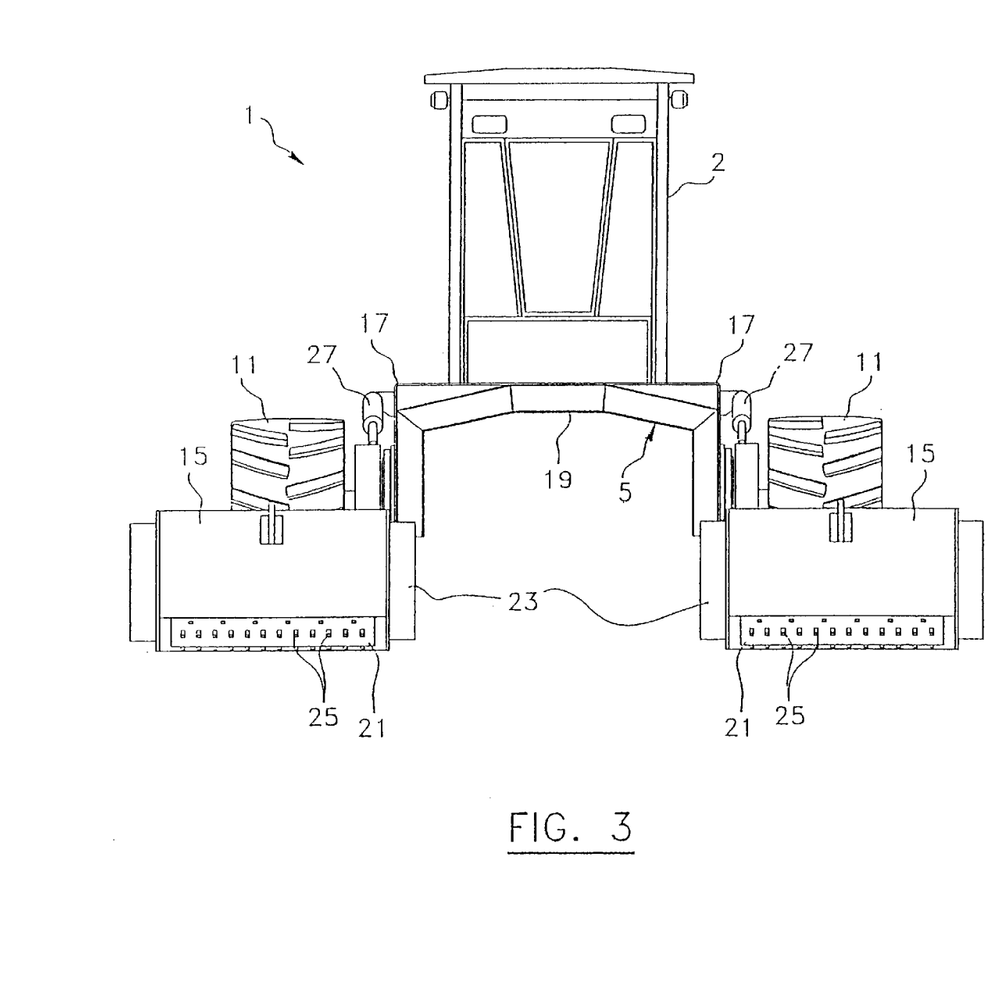
FIG. 3 is a front view of the land clearing tractor shown in FIG. 1 with both its shredder heads in a lowered position.
Figure 4:
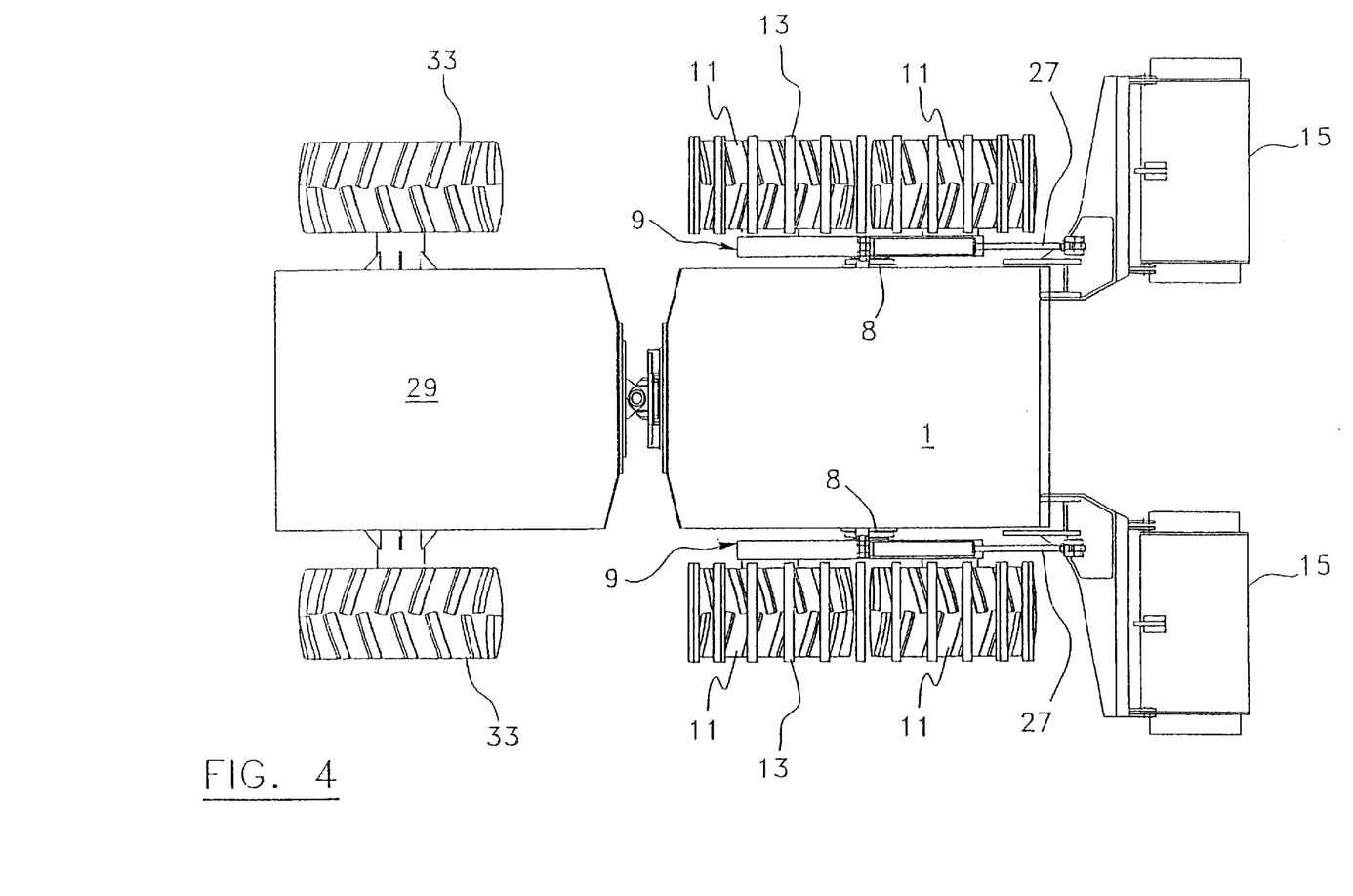
FIG. 4 is a top view of the land clearing tractor shown in FIG. 1.

The tractor 1 has a supporting frame 5 connected to the traction unit 3. As best shown in FIG. 3, the supporting frame 5 preferably has a generally inverted U-shaped cross-section with two opposite sides 17 and a raised section 19 between the opposite sides 17.

The traction unit 3 preferably includes sets of traction wheels 11 that are operatively connected to each side 17 of the frame 5. Preferably, each of the traction wheels 11 on the corresponding side 17 of the frame 5 are mounted onto a double tandem axle 9 which is pivotally connected to the supporting frame 5 by means of a pivoting anchor 8. Each traction wheel 11 is preferably driven by a respective drive shaft of a hydraulic motor (not shown) which is mounted onto the axle of each wheel 11 and which is commonly called hydrostatic motor-wheel. These hydraulic motors are preferably powered by a diesel motor (not shown) which is mounted on the supporting frame 5 of the tractor 1. The principle of operation of these hydraulic motors for driving the traction wheels 11 is well known in the art and will not be described in more detail herein. Furthermore, a track or continuous chain tread 13 may be positioned around the wheels 11 on each side of the tractor 1 for improving traction thereof.

Figure 6:
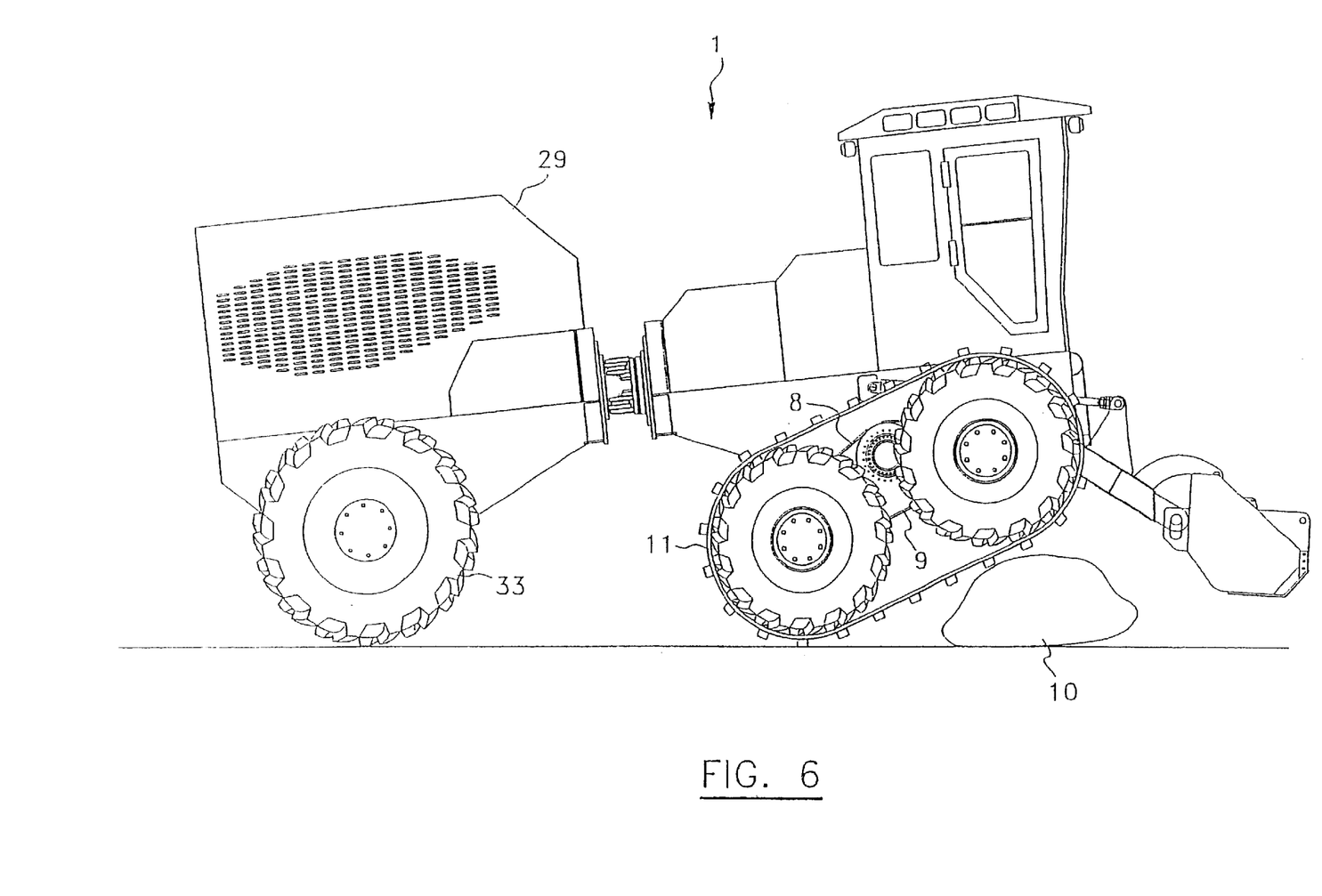
FIGS. 6 and 7 are side views of the land clearing tractor shown in FIG. 1 as it climbs over an obstacle.
Figure 7:
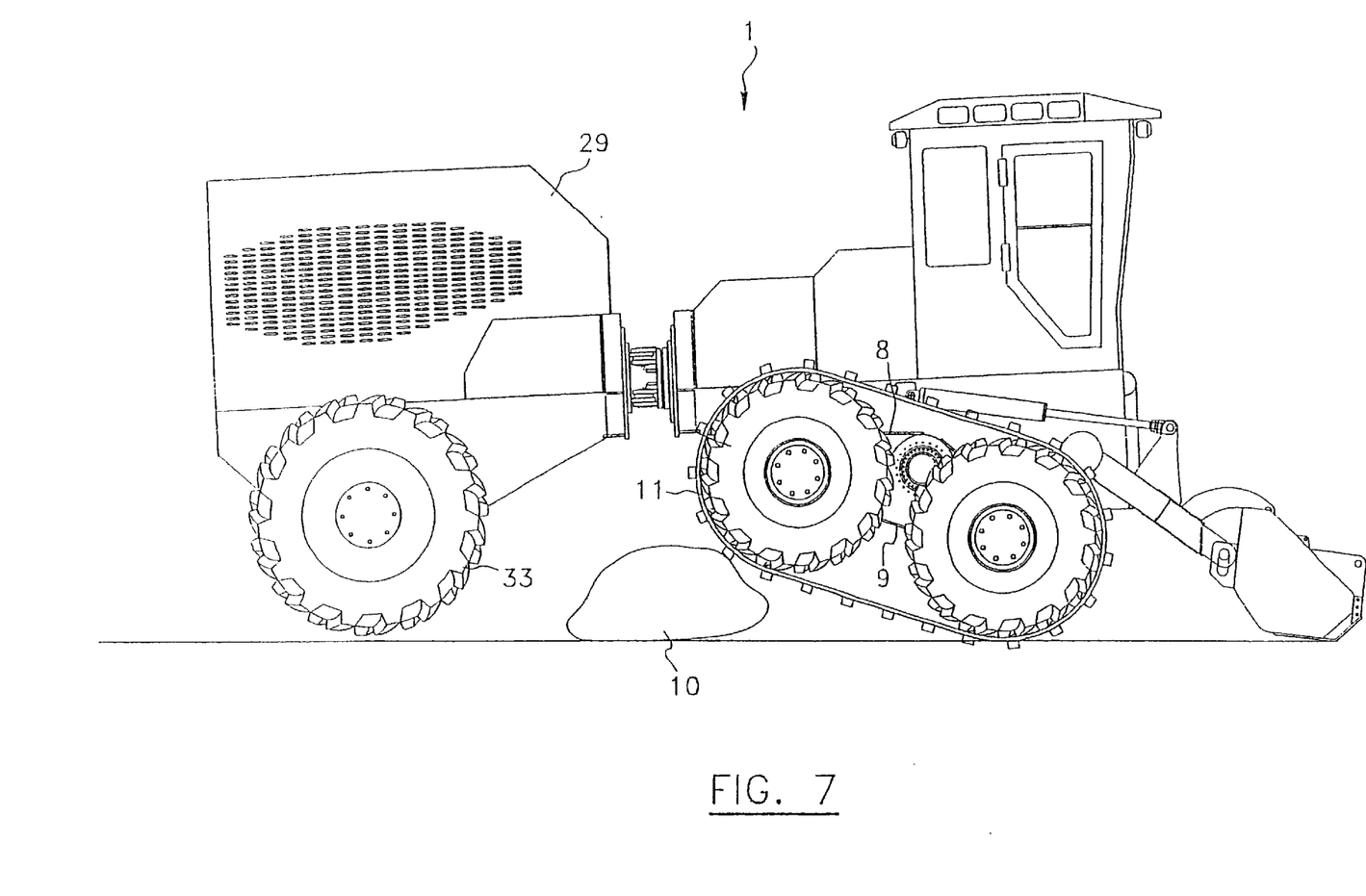

Referring to FIGS. 6 and 7, the land clearing tractor 1 is able to climb over obstacles and objects encountered in a forest site by means of the pivoting double tandem axles 9 and thanks to the pivoting anchors 8. For example, the tractor 1 is shown climbing over a rock 10.

As best shown in FIG. 3, the land clearing tractor 1 is provided with a pair of shredder heads 15 mounted in parallel at the front end of the supporting frame 5. Each of the shredder heads 15 is operatively connected to a respective side 17 of the supporting frame 5.

As can be appreciated, the raised section 19 of the supporting frame 5 that is located in between the shredder heads 15 allows the relatively safe passage of brush and trees thereunder. It is preferable that the raised section 19 be provided with a smooth surface so as to inflict minimal damage to brush and trees passing thereunder. The raised section 19 is preferably spaced between 0.5 to 1.5 meters from the ground.

The shredder heads 15 used may be of conventional type, such as the Bull Hog (trademark) shredder heads made by FECON. The shredder heads 15 are oriented parallel to the direction of travel of the tractor 1 and are spaced apart from each other so as to clear brush and trees in a separate bands and leaving there between a residual band of brush and trees. As with conventional types of shredder heads, the shredder heads 15 are movable between elevated and lowered positions for a more adequate clearing of the brush and trees. The shredder heads 15 are also preferably aligned in front of each of the side wheels 11, thereby facilitating the travel of the tractor 1 through a forest site. A flexible guard panel 7 may be provided at the front end of the tractor 1 to block branches from hitting the cabin 2 when the tractor 1 is moving forward and to prevent the branches of the brush and trees passing underneath the frame 5 from being cut by sharp edges of the tractor 1.

Each of the shredder heads 15 preferably has a horizontally disposed cylindrical drum 21 rotatably mounted in a housing 23. A plurality of spaced teeth 25 are provided on each drum 21 in order to fragment brushes and trees.

U.S. Pat. No. 4,355,670 (OHRBERG et al.) discloses another example of shredder head assembly that can be adapted to the tractor 1 of the present invention.

As persons skilled in the art will understand many changes can be brought to the structure of the above tractor. For example, the tractor may be provided with a single front shredder head just as in U.S. Pat. No. 4,355,670 (OHRBERG et al.). Such a tractor may be modified by connecting to it a lateral supporting frame provided with a raised section as described above for relatively safe passage of brush and trees thereunder. The other side of this lateral supporting frame is then operatively connected to a second shredder head.

Another way of achieving the same result of the above mentioned tractor is to use a regular tractor provided with a boom that can be directed toward any of the sides of the tractor. This boom supports a supporting frame provided with a raised section and to which are operatively connected two shredder heads on each of its respective sides. Of course, a rigid lateral structure may be used instead of the boom to achieve the same results.

Furthermore, the shredder heads do not have to be mounted at the front of the tractor, but these can be positioned in parallel at the back of the tractor as well.

Preferably, each of the shredder heads 15 is connected to its respective side 17 of the frame 5 by means of an actuating lever arm 22. Both lever arms 22 are preferably pivotally mounted on each side 17 of the frame and are each connected to an operator controlled hydraulic cylinder 27 also attached to the sides 17 of the frame 5 for pivoting the shredder heads 15 between lowered and elevated positions. Persons skilled in the art will understand that other mechanisms may be used to achieve the same results. For example, a mechanism can be designed where each of the shredder heads is only displaced vertically between lowered and elevated positions, without being pivoted on a lever arm.

Referring now to FIGS. 1, 2, 4 and 5, the land clearing tractor 1 may be further provided with a rear cart 29 which is coupled to a rear section 28 of the tractor 1 through a pair of pivoting coupling attachments 31. The rear cart 29 is provided with a pair of side wheels 33 and with a second motor (not shown) which is operatively connected to the hydraulic cylinders 27 actuating the shredder heads 15 and moving each of these between elevated and lowered positions. The second motor is also preferably operatively linked to the drum 21 for actuating the same. The second motor may be a diesel motor powering a hydraulic pump having conduits (not shown) extending towards the shredder heads 15. Of course, those skilled in the art will understand that the first motor (not shown) that is already mounted in the land clearing tractor 1 may also perform these functions of moving and actuating the shredder heads 15 in addition to actuating the traction unit 3. Alternatively, the first motor can be entirely discarded and only the second diesel motor in the rear cart can be used.

Figure 5:
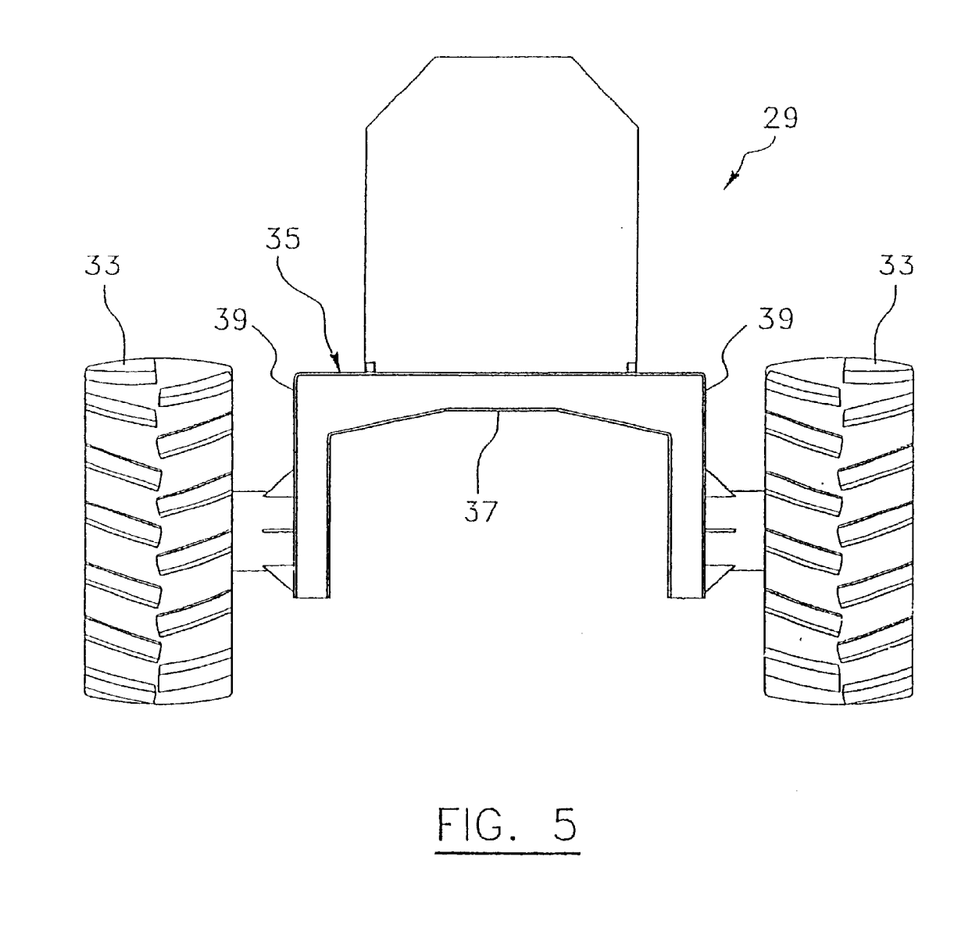
FIG. 5 is back view of the land clearing tractor shown in FIG. 1.

As best shown in FIG. 5, the cart 29 has a supporting frame 35 provided with a raised section 37 between sides 39 thereof, similar to the raised section 19 of the tractor 1. The purpose of the raised section 37 of the cart 29 is the same as discussed above: to allow the passage of brush and trees thereunder.

The first embodiment of the present invention is also directed to a land clearing process, which essentially comprises the steps of:

clearing simultaneously first and second parallel and spaced apart bands of brush and trees with a land clearing tractor; and manually and selectively cutting brush and trees in a residual band between the two parallel and spaced apart bands.

In the above manual cutting step the quantity and quality of brush and trees to be cut in the residual band may vary according to particular requirements. The manual cut is preferably done by workers equipped with portable shredder tools.

The above process is also preferably accomplished by means of the land clearing tractor 1 which was described above. The process may then also comprise the following steps:

moving the tractor 1 along the direction of travel; and
moving the shredder heads 15 between elevated and lowered positions for clearing brush and trees in two spaced apart bands and leaving there between a residual band.

In use, the land clearing tractor 1 cleared two bands of 1.75 meters of width separated by a residual band of 1.8 meters. Furthermore, tests have shown that if the raised section of the supporting frame has a height of 1.3 meters, trees having a height of 4 meters suffer damages in the order of 25%, whereas trees having a height of 3 meters suffer damages in the order of 5%.

The land clearing tractor of the present invention can be used in forest sites for pre-commercial clearing where the age of the trees ranges between 10 to 20 years and also in forest sites for regeneration clearing where the age of the trees is less than 10 years.

The use of the land clearing tractor of the present invention in the above process reduces the work up to 30 and 50 percent as compared with traditional selective clearing methods.

Persons skilled in the art will appreciate that the land clearing tractor of the present invention can also be used for performing a total clear of brush and trees in a field. In this case, the land clearing is moved in overlapping passes that also clear the residual bands of brush and trees.

Second Preferred Embodiment of the Invention—Tree Harvester/tree Picking Apparatus and Method Associated Thereto Broadly described, the mobile silvicultural apparatus according to the second preferred embodiment of the invention as illustrated in FIGS. 8–12 is a mobile silvicultural apparatus 101 for use in a land of trees comprising mature trees and immature trees (both not shown). The apparatus 101 comprises a steerable wheeled support frame 103, an articulated boom 105, motor means 107, and control means 109. The steerable wheeled support frame comprises a horizontally extending ground-clearing section 111, and first and second opposite vertical side sections 113. As better shown in FIGS. 10 and 11, the ground-clearing 111 and side sections 113 define a tunnel-shaped passage 115 through which the immature trees are allowed to pass as the support frame 103 travels thereover. The articulated boom 105 is mounted to the support frame 103 for selectively manipulating the mature trees. The motor means 107 are used for imparting motion to the support frame 103 and the control means 109 are used for controlling the steerable support frame 103, the motor means 107, and the articulated boom 105.

Figure 10:
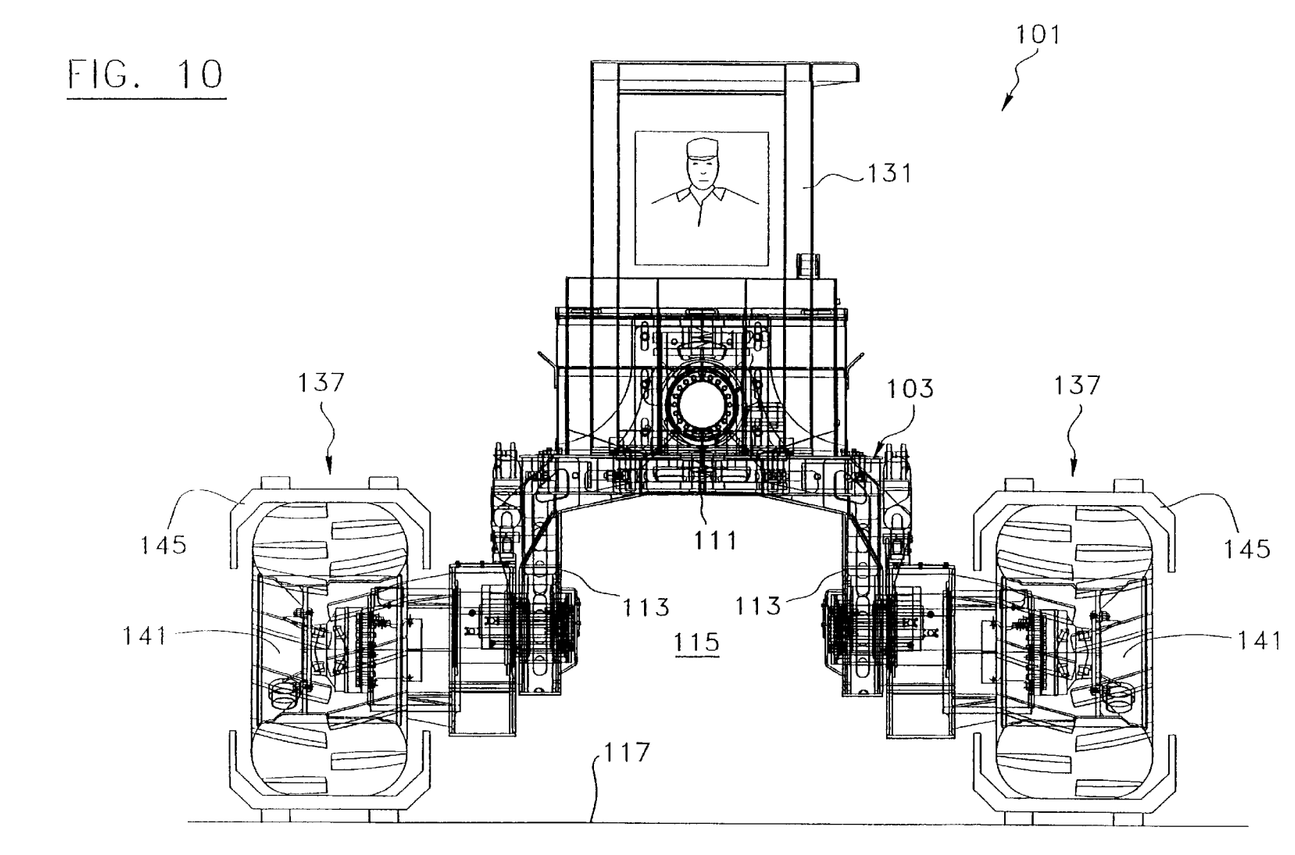
FIG. 10 is a front elevational view of the mobile silvicultural apparatus shown in FIG. 8.
Figure 11:
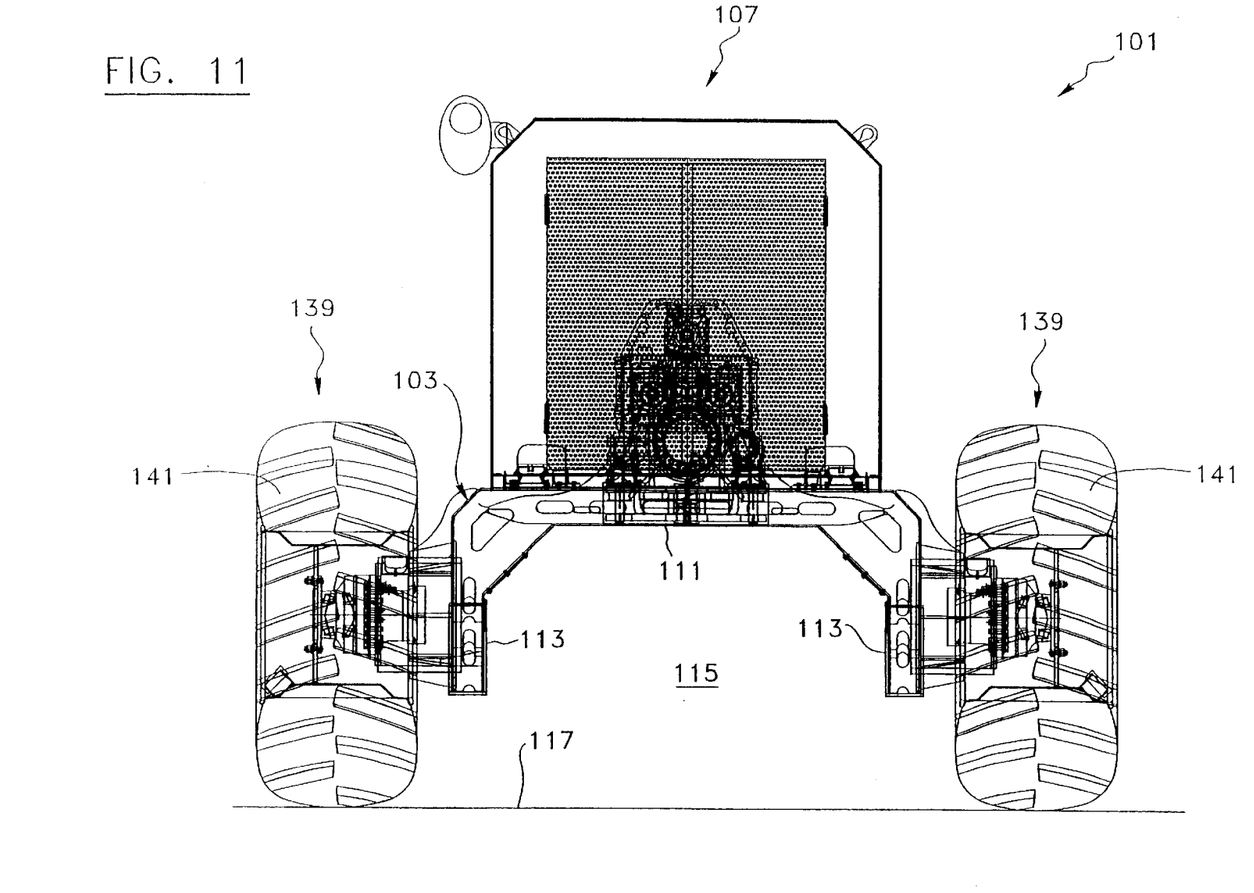
FIG. 11 is a rear elevational view of the mobile silvicultural apparatus shown in FIG. 8.

As also better shown in FIGS. 10 and 11, the tunnel-shaped passage 115 preferably has a smooth configuration in order to minimize damages to the immature trees passing through the tunnel-shaped passage 115 as the ground-clearing section 111 of the support frame 103 travels over the immature trees. It should be understood that, according to the present invention, the tunnel-shaped passage 115 may take on different cross-sectional geometries depending on the particular applications of the mobile silvicultural apparatus 101, as apparent to a person skilled in the art.

Preferably also, the ground-clearing section 111 of the support frame 103 is positioned between about 0.5 to about 1.5 meters from ground 117. It is worth mentioning here that the ground-clearing section 111 of the support frame 103 may be positioned at different heights from ground 117 depending on the particular applications of the mobile silvicultural apparatus 101, as also apparent to a person skilled in the art.

Figure 8:
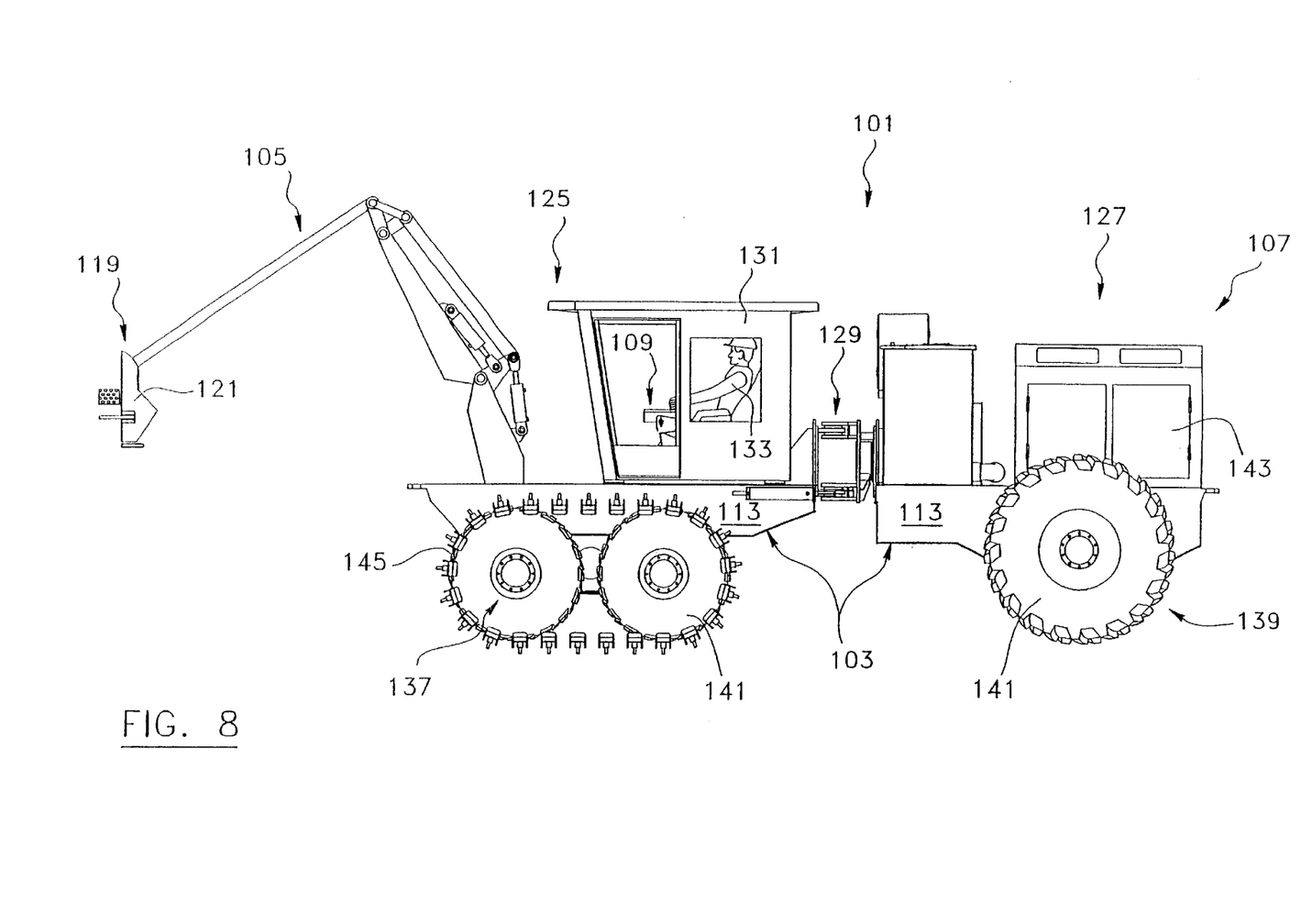
FIG. 8 is a side elevational view of the mobile silvicultural apparatus according to the second preferred embodiment of the invention.
Figure 9:
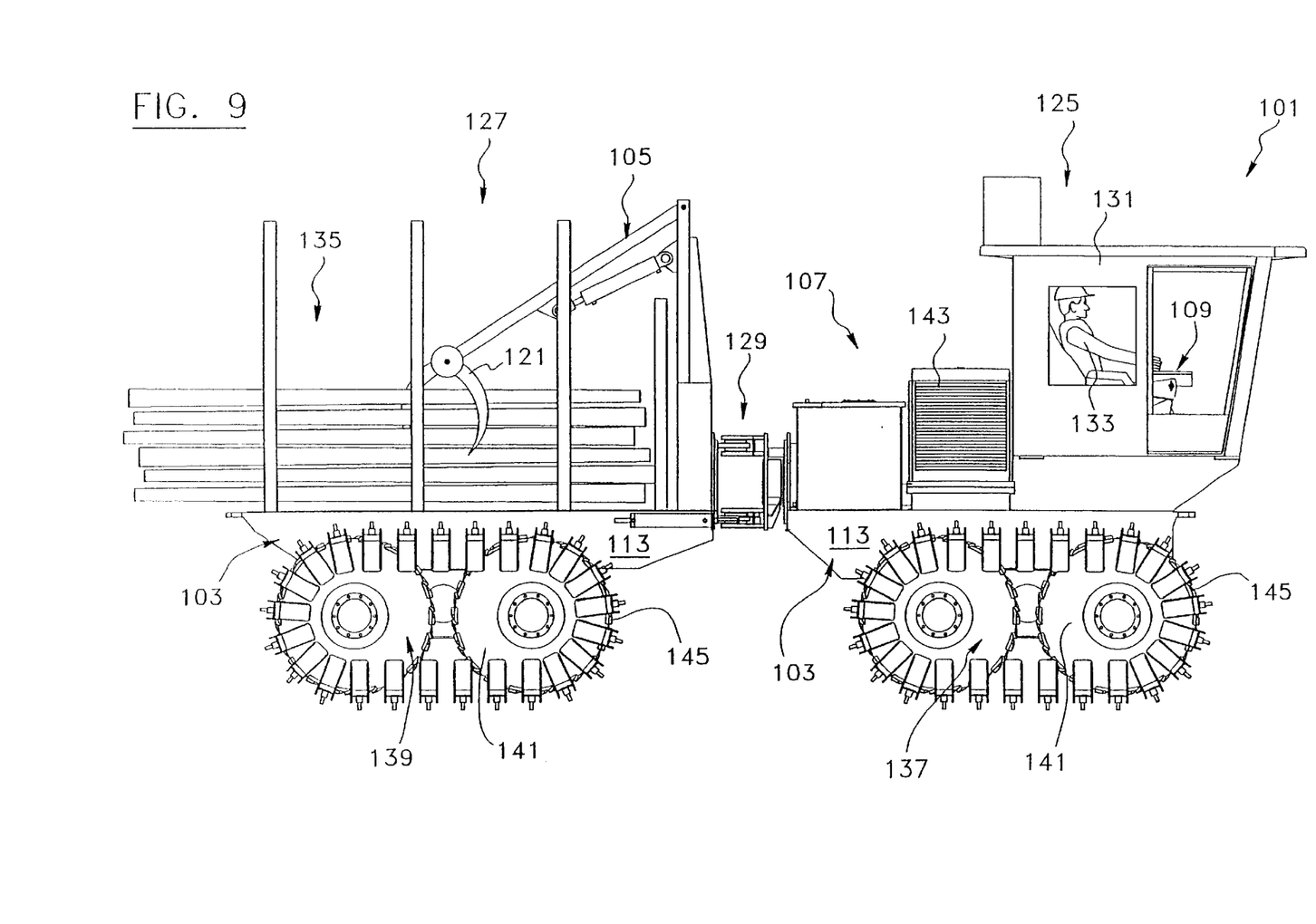
FIG. 9 is a side elevational view of the mobile silvicultural apparatus according to another aspect of the second preferred embodiment of the invention.

Referring now back to FIGS. 8 and 9, the articulated boom 105 comprises a harvester head 119 which is selected from the group consisting of a multi-functional tree feller 121 and a grapple 123 for grappling a tree, depending on the particular function of the mobile silvicultural apparatus 101. It is to be understood also that the expression "articulated boom 105" as used in the context of the present description does not necessarily restrict itself to a boom 105 per se, but also includes any other type of device which could be used with the mobile silvicultural apparatus 101 according to the present invention, in order to carry out different harvesting processes, as also apparent to a person skilled in the art.

As better shown in FIGS. 8 and 9, the steerable wheeled support frame 103 preferably comprises front and rear units 125, 127 and a universal joint 129 for coupling the front unit 125 to the rear unit 127. It is worth mentioning that other suitable joining means may be used for hingedly coupling the front unit to the rear unit, as also apparent to a person skilled in the art. These joining means may have one or several degrees of freedom depending on the particular applications of the mobile silvicultural apparatus and the type and geometry of terrain that it must travel over.

As also shown in FIGS. 8 and 9, the front unit 125 of the support frame 103 preferably comprises a cabin 131 for housing an operator 133 of the mobile silvicultural apparatus 101.

According to the first aspect of the second preferred embodiment of the invention as shown in FIG. 8, the articulated boom 105 is preferably mounted onto the front unit 125 of the support frame 103 and comprises a harvester head 119 provided with a multi-functional tree feller 121. According to this particular aspect, the mobile silvicultural apparatus 101 acts mainly as a tree harvesting apparatus 101.

Referring now to the mobile silvicultural apparatus shown in FIG. 9, the rear unit 127 of the support frame 103 preferably comprises receiving means 135 for receiving selectively manipulated mature trees. According to this particular aspect, the articulated boom 105 is preferably mounted onto the rear unit 127 of the support frame 103 and is provided with a grapple 123 for grappling a tree and unloading the same into the receiving means 135. According to this particular aspect of the second preferred embodiment of the invention, the mobile silvicultural apparatus 101 acts mainly as a picking apparatus 101 for harvested trees.

As better shown in FIGS. 8–11, the mobile silvicultural apparatus 101 according to the present invention preferably comprises front and rear wheeled assemblies 137, 139 mounted respectively to the front and rear units 125, 127 of the support frame 103. The front wheeled assembly 137 preferably comprises left and right front wheels 141 mounted respectively to the vertical side sections 113 of the front unit 125 whereas the rear wheeled assembly 139 preferably comprises left and right rear wheels 141 mounted respectively to the vertical side sections 113 of the rear unit 127. The wheels 141, whether front and/or rear, are preferably hydrostatic motor-wheels 141 and the motor means preferably comprise a diesel engine 143 operating hydraulic pumps operatively connected to these hydrostatic motor-wheels 141 for driving the same. It is worth mentioning that each wheeled assembly 137, 139 may comprise one or several wheels 141, and each wheeled assembly 137, 139 may be pivotable with respect to the support frame 103, so as to enable the mobile silvicultural apparatus 101 to travel over different adverse terrains, such as rocks and/or the like for example, as apparent to a person skilled in the art. Furthermore, either the front and/or the rear wheeled assemblies 137, 139 may be the driving wheeled assemblies of the mobile silvicultural apparatus 101 and may be provided with suitable accessories to ensure proper traction of the apparatus 101 along the land of trees to be harvest, as also apparent to a person skilled in the art. Hence, the front and rear wheeled assemblies 137, 139 and the motor means 107 used therewith are not necessarily limited to the ones described herein and may vary greatly depending on the particular applications of the mobile silvicultural apparatus 101, without departing from the scope of the present invention.

The diesel engine 143 may be mounted either on the rear unit 127 of the support frame 103, as better shown in FIG. 8, or on the front unit 125 thereof, as better shown in FIG. 9, depending on the particular applications of the mobile silvicultural apparatus 101, as apparent to a person skilled in the art.

Irrespectively of these preferred embodiments, the hydrostatic motor-wheels 141 are preferably provided with chain treads 145 for, among other advantages, increasing the traction of the mobile silvicultural apparatus 101 along adverse terrain of the land comprising the trees to be harvested.

Figure 12:
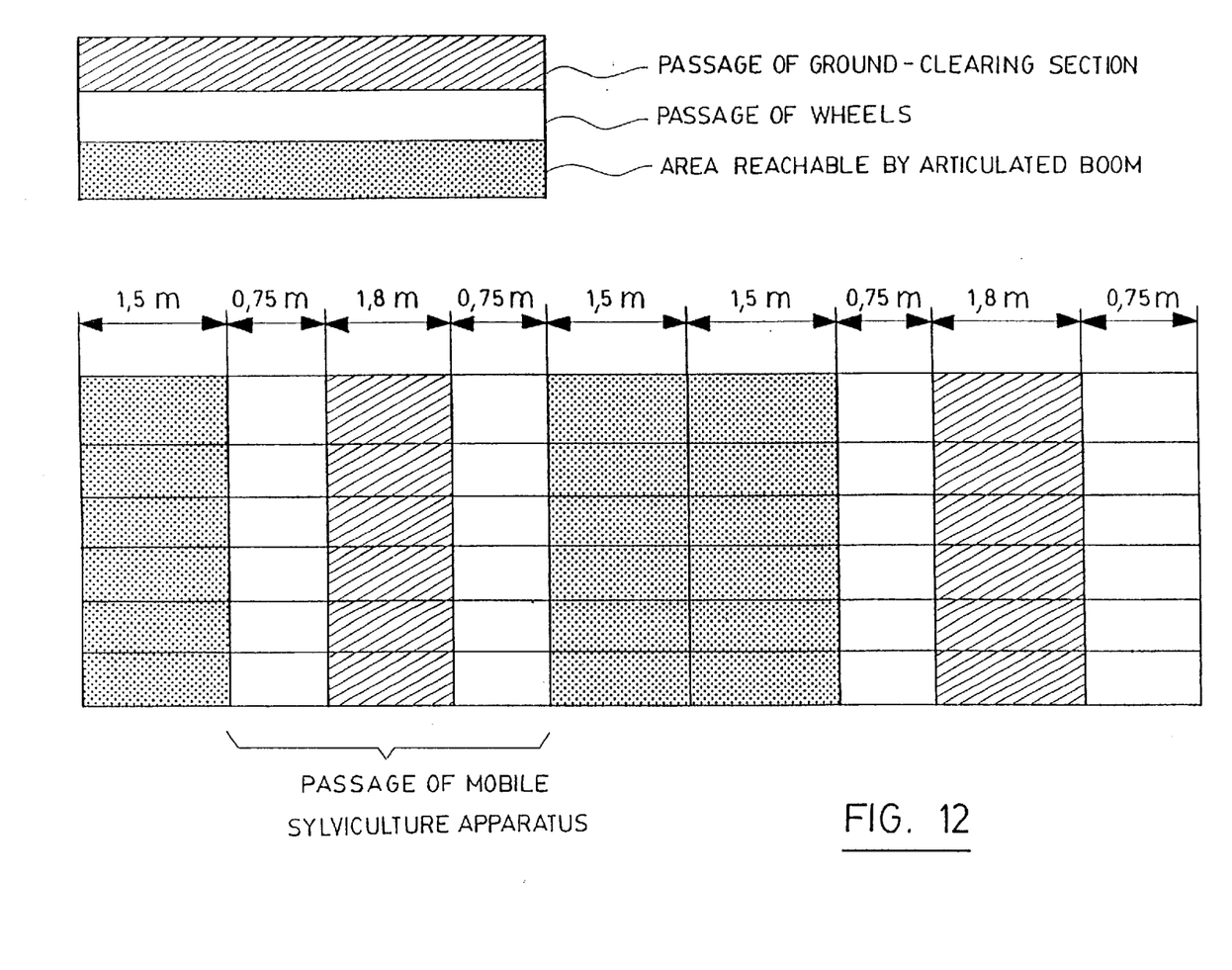
FIG. 12 is a schematic of the silvicultural method according to the second preferred embodiment of the invention.

According to another aspect of the second preferred embodiment of the present invention and as shown schematically in FIG. 12, there is also provided a silvicultural method for harvesting mature trees in a land of trees comprising mature trees and immature trees. The method comprises the steps of a) providing the above-mentioned and discussed mobile silvicultural apparatus 101; b) driving the apparatus 101 of step a) along a first strip of the land; c) stopping the apparatus 101 at different locations along the strip of land; and d) felling and harvesting mature trees located around each of said different locations.

Preferably, the silvicultural method comprises the additional steps of e) providing an apparatus 101 according to the present invention such as the one illustrated in FIG. 9; f) driving the apparatus 101 of step e) along the strip of land; and g) picking up at each of said different locations the harvest mature trees and transporting the same outside the land.

Preferably also, the silvicultural method comprises the step of h) sequentially repeating steps a) to g) along additional strips of land substantially parallel to the first strip of land until a desired portion of the land is harvested.

Preferably also, the above-mentioned silvicultural method comprises, prior to performing a first sequence of step a) to g), a step of determining a distance between each said strips of land, the distance between determined such that a minimum amount of said strips is required to harvest the desired portion of the land.

As may now be appreciated, the mobile silvicultural apparatus 101 according to the second preferred embodiment of the present invention is an improvement over the prior art in that it enables, due to its design and different components possible as explained hereinabove, to carry out pre-commercial thinning in adverse circumstances in a safer, more efficient, and more cost-effective manner than what is possible with motor-manual teams. Furthermore, the present invention is also advantageous in that, due to particularly but not limitedly the tunnel-shaped passage 115 and the articulated boom 105 of the mobile silvicultural apparatus 101, it enables to carry out tree length and cut-to-length harvesting processes while providing a better regeneration distribution coefficient than what is possible with some of the devices of the prior art. Moreover, the present invention, as explained herein, is also advantageous in that it provides an easy, fast, and cost-effective manner of carrying out different silvicultural processes, such as selective clearing for example.

Of course, numerous modifications can be made to the above-described embodiments without departing from the scope of the invention as described in the appended claims.

What is claimed is:

1. A mobile silvicultural apparatus for use in a land of trees comprising mature trees and immature trees, the apparatus comprising:

a steerable wheeled support frame comprising a horizontally extending ground-clearing section, and first and second opposite vertical side sections, the ground-clearing and side sections defining a tunnel-shaped passage through which the immature trees are allowed to pass as the support frame travels thereover, the support frame further comprising front and rear units and a universal joint coupling the front unit to the rear unit;

front and rear wheeled assemblies mounted respectively to the front and rear units of the support frame, the front wheeled assembly comprising left and right front wheels respectively mounted to the vertical side sections of the front unit, and the rear wheeled assembly comprising left and right rear wheels mounted respectively to the vertical side sections of the rear unit, the front wheels being hydrostatic motor-wheels;

an articulated boom mounted to the support frame for selectively manipulating the mature trees;

motor means for imparting motion to the support frame, the motor means comprising a diesel engine operating hydraulic pumps operatively connected to the hydrostatic motor-wheels for driving the same; and control means for controlling the steerable support frame, the motor means, and the articulated boom.

2. A mobile silvicultural apparatus according to claim 1, wherein the tunnel-shaped passage has a smooth configuration in order to minimize damages to the immature trees passing through the tunnel-shaped passage as the ground-clearing section of the support frame travels over said immature trees.

3. A mobile silvicultural apparatus according to claim 1, wherein the ground-clearing section of the support frame is positioned between about 0.5 to about 1.5 meters from ground.

4. A mobile silvicultural apparatus according to claim 1, wherein the articulated boom comprises a harvester head selected from the group consisting of a multi-functional tree feller and a grapple for grappling a tree.

5. A mobile silvicultural apparatus according to claim 1, wherein the front unit of the support frame comprises a cabin for housing an operator of the mobile silvicultural apparatus.

6. A mobile silvicultural apparatus according to claim 5, wherein the articulated boom is mounted onto the front unit of the support frame and comprises a harvester head provided with a multi-functional tree feller.

7. A mobile silvicultural apparatus according to claim 5, wherein the rear unit of the support frame comprises receiving means for receiving selectively manipulated mature trees.

8. A mobile silvicultural apparatus according to claim 7, wherein the articulated boom is mounted onto the rear unit of the support frame and is provided with a grapple for grappling a tree and unloading the same into the receiving means.

9. A mobile silvicultural apparatus according to claim 1, wherein the rear wheels are hydrostatic motor-wheels.

10. A mobile silvicultural apparatus according to claim 1, wherein the diesel engine is mounted on the rear unit of the support frame.

11. A mobile silvicultural apparatus according to claim 1, wherein the diesel engine is mounted on the front unit of the support frame.

12. A mobile silvicultural apparatus according to claim 9, wherein the hydrostatic motor-wheels are provided with chain threads.

13. A mobile silvicultural apparatus for use in a land of trees comprising mature trees and immature trees, the apparatus comprising:

a steerable wheeled support frame comprising alignable front and rear units and a universal joint coupling the front unit to the rear unit, each of the front and rear units having a horizontally extending ground-clearing section positioned between about 0.5 to about 1.5 meters from ground, and first and second opposite vertical side sections, the ground-clearing sections and side sections defining a tunnel-shaped passage through which the immature trees are allowed to pass as the support frame travels thereover; the tunnel-shaped passage having a smooth configuration in order to minimize damages to the immature trees passing through the tunnel-shaped passage as the ground-clearing sections of the support frame travel over said immature trees;

an articulated boom mounted to the support frame for selectively manipulating the mature trees, and comprising a harvester head selected from the group consisting of a multi-functional tree feller and a grapple for grappling a tree, the articulated boom being a multi-functional tree feller;

a cabin mounted on the front unit for housing an operator of the mobile silvicultural apparatus;

front and rear wheeled assemblies mounted respectively to the front and rear units of the support frame, the front wheeled assembly comprising left and right hydrostatic front motor-wheels respectively mounted to the vertical sections of the front unit; and the rear wheeled assembly comprising left and right rear wheels mounted respectively to the vertical sections of the rear section;

motor means for imparting motion to the support frame, the motor means comprising a diesel engine operating hydraulic pumps operatively connected to the hydrostatic front motor-wheels for driving the same, the diesel engine being mounted on the rear unit; and control means for controlling the steerable support frame, the motor means, and the articulated boom.

14. A mobile silvicultural apparatus according to claim 13, wherein:

the articulated boom is a grapple for grappling a tree;

the rear unit comprises receiving means for receiving a tree grappled by the articulated boom; and the diesel engine is mounted on the front unit.

15. A silvicultural method for harvesting mature trees in a land of trees comprising mature trees and immature trees, the method comprising the steps of:

a) providing an apparatus as defined in claim 13;

b) driving the apparatus of step a) along a first strip of the land;

c) stopping the apparatus at different locations along said strip of land; and d) felling and harvesting mature trees located around each of said different positions.

16. A silvicultural method according to claim 15, comprising the additional steps of:

e) providing an apparatus as defined in claim 14;

f) driving the apparatus of step e) along said strip of land; and g) picking up at each of said different locations the harvested mature trees and transporting the same outside the land.

17. A silvicultural method according to claim 16, comprising the step of:

h) sequentially repeating steps a) to g) along additional strips of land substantially parallel to said first strip of land until a desired portion of the land is harvested.

18. A silvicultural method according to claim 17, comprising, prior to performing a first sequence of step a) to g), a step of determining a distance between each said strips of land, said distance being determined such that a minimum amount of said strips is required to harvest the desired portion of the land.

19. A mobile silvicultural apparatus for use in a land of trees comprising mature trees and immature trees, the apparatus comprising:

a steerable wheeled support frame comprising a horizontally extending ground-clearing section, and first and second opposite vertical side sections, the ground-clearing and side sections defining a tunnel-shaped passage through which the immature trees are allowed to pass as the support frame travels thereover, the support frame further comprising front and rear units and a universal joint coupling the front unit to the rear unit, the front unit comprising a cabin for housing an operator of the mobile silvicultural apparatus and the rear unit of the support frame comprising receiving means for receiving selectively manipulated mature trees;

an articulated boom mounted to the support frame for selectively manipulating the mature trees, the articulated boom being mounted onto the rear unit of the support frame and being provided with a grapple for grappling a tree and unloading the same into the receiving means;

motor means for imparting motion to the support frame; and control means for controlling the steerable support frame, the motor means, and the articulated boom.

* * * * *